US007769940B2

(12) United States Patent
Wiler

(10) Patent No.: US 7,769,940 B2
(45) Date of Patent: Aug. 3, 2010

(54) SWITCHING DEVICE CONFIGURED TO COUPLE A FIRST COMPUTER TO A FIRST PERIPHERAL DEVICE AND ONE OR MORE SECOND PERIPHERAL DEVICES AND METHOD OF MANUFACTURING SAME

(75) Inventor: Daniel Wiler, Albion, NY (US)

(73) Assignee: Belkin International, Inc., Playa Vista, CA (US)

( * ) Notice: Subject to any disclaimer, the term of this patent is extended or adjusted under 35 U.S.C. 154(b) by 162 days.

(21) Appl. No.: 12/030,414

(22) Filed: Feb. 13, 2008

(65) Prior Publication Data

US 2009/0204742 A1    Aug. 13, 2009

(51) Int. Cl.
G06F 3/00    (2006.01)
(52) U.S. Cl. .................. 710/316; 710/313; 710/64; 710/72
(58) Field of Classification Search ............. 710/8–12, 710/62–64, 72–74, 300–317
See application file for complete search history.

(56) References Cited

U.S. PATENT DOCUMENTS

| | | | |
|---|---|---|---|
| 4,866,667 | A | 9/1989 | Shimada |
| 5,309,564 | A | 5/1994 | Bradley et al. |
| 5,450,074 | A | 9/1995 | Yoshifuji |
| 5,581,709 | A | 12/1996 | Ito et al. |
| 5,638,521 | A | 6/1997 | Buchala et al. |
| 5,717,957 | A | 2/1998 | Lin |
| 5,721,842 | A | 2/1998 | Beasley et al. |
| 5,754,881 | A | 5/1998 | Aas |
| 5,841,424 | A | 11/1998 | Kikinis |
| 5,884,096 | A | 3/1999 | Beasley et al. |
| 5,961,624 | A | 10/1999 | Takayama |

(Continued)

FOREIGN PATENT DOCUMENTS

CN    1310402 A    8/2001

(Continued)

OTHER PUBLICATIONS

Belkin; OmniView 4-Port USB KVM Switch User Guide; 19 pages; Date: 2000.

(Continued)

*Primary Examiner*—Raymond N Phan
(74) *Attorney, Agent, or Firm*—Bryan Cave LLP

(57) ABSTRACT

In some embodiments, a switching device is configured to couple a first computer to a first peripheral device and one or more second peripheral devices. The switching device is further configured to couple a second computer to a third peripheral device and the one or more second peripheral devices. The switching device includes: (a) a switch configured to couple to the one or more second peripheral devices; (b) a first hub including: (1) a first upstream port configured to couple to the first computer; (2) a first downstream port configured to couple to the first peripheral device; and (3) at least one second downstream port coupled to the switch; (c) a second hub including: (1) a first upstream port configured to couple to the second computer; (2) a first downstream port configured to couple to the third peripheral device; and (3) at least one second downstream port coupled to the switch. Other embodiments are also disclosed herein.

29 Claims, 6 Drawing Sheets

U.S. PATENT DOCUMENTS

| | | | |
|---|---|---|---|
| 6,014,715 | A | 1/2000 | Stoevhase |
| 6,035,345 | A | 3/2000 | Lee |
| 6,073,188 | A | 6/2000 | Fleming |
| 6,131,135 | A | 10/2000 | Abramson et al. |
| 6,141,719 | A | 10/2000 | Rafferty et al. |
| 6,192,423 | B1 | 2/2001 | Graf |
| 6,240,472 | B1 | 5/2001 | Hu |
| 6,256,014 | B1 | 7/2001 | Thomas et al. |
| 6,263,374 | B1 | 7/2001 | Oinwich et al. |
| 6,263,392 | B1 | 7/2001 | McCauley |
| 6,295,570 | B1 | 9/2001 | Clemens et al. |
| 6,304,895 | B1 | 10/2001 | Schneider et al. |
| 6,308,239 | B1 | 10/2001 | Osakada et al. |
| 6,314,479 | B1 | 11/2001 | Frederick et al. |
| 6,324,605 | B1 | 11/2001 | Rafferty et al. |
| 6,373,500 | B1 | 4/2002 | Daniels |
| 6,378,014 | B1* | 4/2002 | Shirley ................ 710/100 |
| 6,532,512 | B1 | 3/2003 | Torii et al. |
| 6,549,966 | B1 | 4/2003 | Dickens et al. |
| 6,557,170 | B1 | 4/2003 | Wilder et al. |
| 6,578,089 | B1 | 6/2003 | Simpson et al. |
| 6,600,739 | B1 | 7/2003 | Evans et al. |
| 6,615,272 | B1 | 9/2003 | Ambrose |
| 6,671,756 | B1 | 12/2003 | Thomas et al. |
| 6,697,905 | B1 | 2/2004 | Bealkowski |
| 6,715,010 | B2 | 3/2004 | Kumata |
| 6,772,253 | B1 | 8/2004 | Slaight et al. |
| 6,791,950 | B2 | 9/2004 | Wu |
| 6,874,042 | B2 | 3/2005 | Sauber |
| 6,957,287 | B2 | 10/2005 | Lou et al. |
| 7,321,943 | B2* | 1/2008 | Shirley ................ 710/62 |
| 7,330,919 | B2 | 2/2008 | Zhang |
| 7,340,556 | B2 | 3/2008 | Lou et al. |
| 7,433,991 | B2* | 10/2008 | Fujita et al. ............ 710/316 |
| 7,472,217 | B2* | 12/2008 | Lou et al. ............ 710/316 |
| 7,493,421 | B2* | 2/2009 | Huang ................ 710/12 |
| 2003/0005186 | A1 | 1/2003 | Gough |
| 2003/0093599 | A1* | 5/2003 | Lou et al. ............ 710/72 |
| 2005/0216620 | A1* | 9/2005 | Sandulescu et al. ...... 710/62 |
| 2005/0273312 | A1* | 12/2005 | Sandulescu et al. ...... 703/25 |
| 2005/0275641 | A1 | 12/2005 | Franz |
| 2006/0123182 | A1* | 6/2006 | Sandulescu et al. ...... 710/316 |
| 2006/0253639 | A1 | 11/2006 | Lee et al. |
| 2007/0174535 | A1 | 7/2007 | Lou |
| 2009/0198848 | A1* | 8/2009 | Chien ................ 710/72 |

FOREIGN PATENT DOCUMENTS

| | | |
|---|---|---|
| JP | 02-148157 | 6/1990 |
| JP | 10-187303 | 7/1998 |
| JP | 2000-196648 | 7/2000 |
| JP | 2000-242377 | 9/2000 |
| JP | 11-216969 | 2/2001 |
| JP | 2001-043178 | 2/2001 |
| JP | 2001-229119 | 8/2001 |
| JP | 2001-256172 | 9/2001 |
| JP | 2001-282701 | 10/2001 |
| WO | 03/042844 | 5/2003 |
| WO | 2007/130876 | 11/2007 |

OTHER PUBLICATIONS

Crossbar switch; http://en.wikipedia.org/wiki/Crossbar_switch; 5 pages; Jul. 10, 2007.

Belkin; SOHO KVM Switch, Dual-Head VGA & USB; http://catalog.belkin.com/IWCatProductPage.process?Product Id=262690; 2 pages; Jun. 15, 2007.

International Search Report; Application No. PCT/US 09/34141; Feb. 9, 2009; 9 pages.

* cited by examiner

SWITCHING DEVICE CONFIGURED TO COUPLE A FIRST COMPUTER TO A FIRST PERIPHERAL DEVICE AND ONE OR MORE SECOND PERIPHERAL DEVICES AND METHOD OF MANUFACTURING SAME

FIELD OF THE INVENTION

This invention relates generally to switching devices, and relates more particularly to switching devices that couple two or more computers to two or more peripheral devices and methods of manufacturing the same.

DESCRIPTION OF THE BACKGROUND

Peripheral or KVM (keyboard, video, and mouse) switches allow a keyboard, a mouse, a video monitor, or other peripheral devices to interact with or be controlled by a computer selected from a group of computers. Although peripheral switches take a variety of forms, their essential purpose is to allow a keyboard, a mouse, a video monitor, and other peripheral devices to interact with the selected computer such that the computer receives and transmits signals to and from the various peripheral devices regardless of the data protocol schemes employed by either the selected computer or the peripheral devices.

Typically, however, peripheral switches do not allow a first computer to continue controlling a first peripheral device while control of the other peripheral device(s) is switched to a second computer. In some situations, a user might want the first computer to continue performing a task (e.g., performing a data transfer or playing music) using a first peripheral device while the second computer uses the other peripheral devices. In some situations, such as performing a data transfer, any interruption of the control or the connection between the computer and the peripheral device could cause file system corruption or data loss.

Accordingly, a need or potential for benefit exists for a switching apparatus or system that allows a first computer to continue to control a first peripheral device while control of other peripheral devices is switched to other computers.

BRIEF DESCRIPTION OF THE DRAWINGS

To facilitate further description of the embodiments, the following drawings are provided in which.

Figure 1:
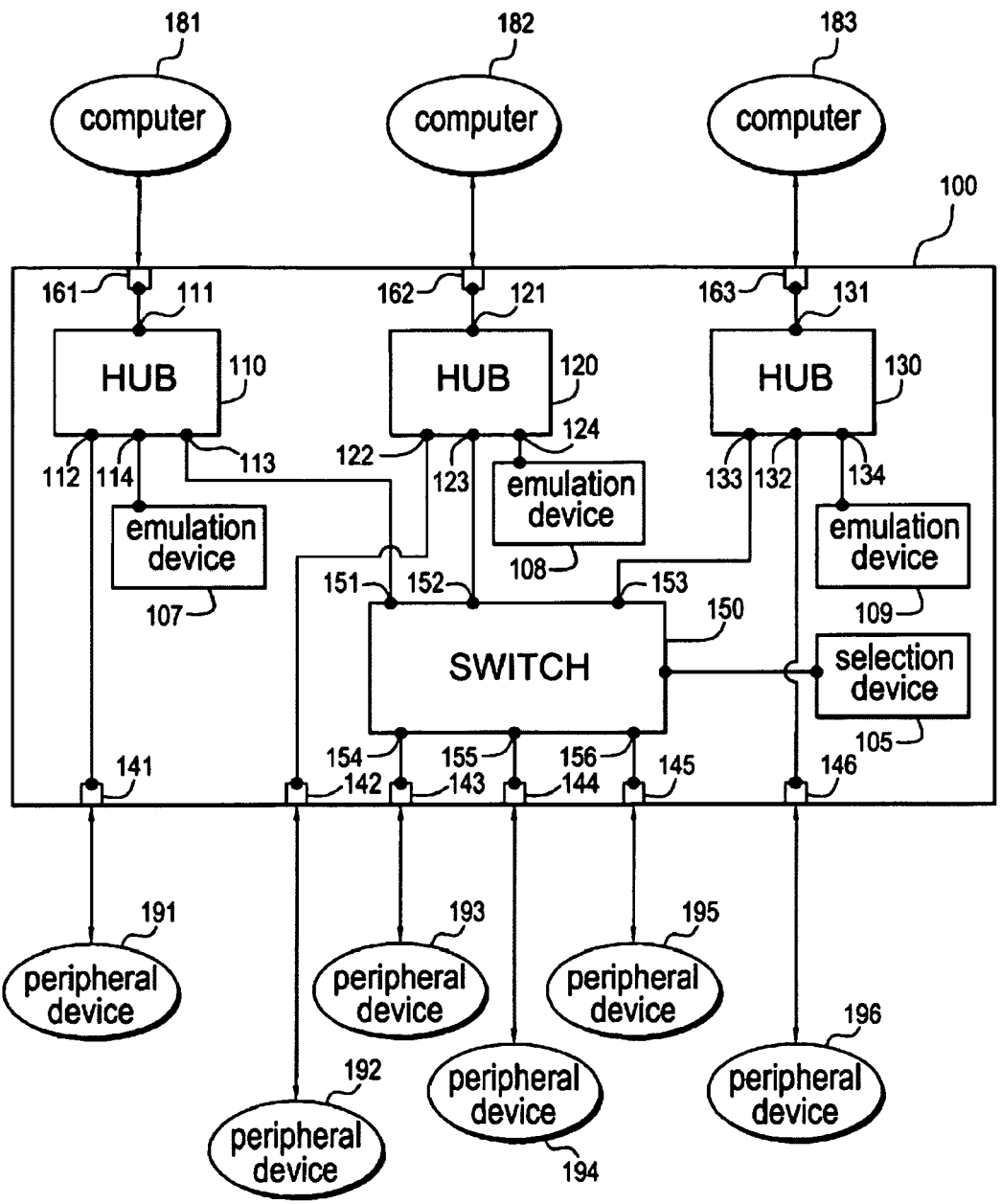
FIG. 1 illustrates a switching device coupling three computers to six peripheral devices, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "on," as used herein, is defined as on, at, or otherwise adjacent to or next to or over.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of an electrical connector being coupled to a peripheral device does not mean that the peripheral cannot be removed (readily or otherwise) from the electrical connector.

"Peripheral device," as used herein, can refer to any electrical device that can be coupled to a computer to expand its functionality or abilities. For example, a peripheral device can be a mouse, a keyboard, a video monitor or display, a printer, a scanner, a disk drive, a tape drive, a microphone, a speaker, a digital media player, a joystick, a CD-ROM (computer disk read only memory) player, a DVD (digital video disk) player, a USB (universal serial bus) hub, flash memory drive (e.g., a thumb drive), or a camera. "Mouse," as used herein, includes all computer input point devices (mice, trackballs, touchpad, pointing sticks, etc.).

DETAILED DESCRIPTION OF EXAMPLES OF EMBODIMENTS

In a number of embodiments, a switching device is configured to couple a first computer to a first peripheral device and one or more second peripheral devices. The switching device is further configured to couple a second computer to a third peripheral device and the one or more second peripheral devices. The switching device includes: (a) a switch configured to couple to the one or more second peripheral devices; (b) a first hub including: (1) a first upstream port configured to couple to the first computer; (2) a first downstream port configured to couple to the first peripheral device; and (3) at least one second downstream port coupled to the switch; (c) a second hub including: (1) a first upstream port configured to couple to the second computer; (2) a first downstream port configured to couple to the third peripheral device; and (3) at least one second downstream port coupled to the switch.

In other embodiments, an electronic switchbox is configured to switch a keyboard and a mouse between two or more computers and also couple the two or more computers to two or more peripheral devices. The electrical switchbox includes: (a) a keyboard switch configured to couple to the keyboard; (b) a mouse switch configured to couple to the mouse; and (c) two or more hubs. In some examples, each hub of the two or more hubs is configured to couple one computer of the two or more computers to the keyboard switch and the mouse switch. Each of the one or more hubs can be further configured to couple directly to at least one peripheral device of the two or more peripheral devices.

In a further embodiment, an apparatus can be configured to switch one or more first peripheral devices between at least two computers. Furthermore, the apparatus is also configured to couple a first computer of the at least two computers to one or more second peripheral devices and to couple a second computer of the at least two computers to one or more third peripheral devices. The apparatus can include: (a) a switch configured to couple to the at least two computers and the one or more first peripheral devices; (b) a first connector configured to couple to the first computer of the at least two computers; (c) a second connector coupled to the first connector and configured to couple to the one or more second peripheral devices; (d) a third connector configured to couple to the second computer of the at least two computers; and (e) a fourth connector coupled to the third connector and configured to couple to the one or more third peripheral devices.

In yet other embodiments, an apparatus is configured to switch one or more first peripheral devices between at least two computers. The apparatus is also configured to couple a first computer of the at least two computers to one or more third peripheral devices and couple a second computer of the at least two computers to one or more fourth peripheral devices. The apparatus includes: (a) a switch configured to couple to the at least two computers and the one or more first peripheral devices; (b) a first hub configured to couple to the first computer of the at least two computers and the one or more third peripheral devices; and (c) a second hub configured couple to the second computer of the at least two computers and the one or more fourth peripheral devices.

Still further embodiments teach a method of manufacturing a switching apparatus. In these embodiments, the switching apparatus can be configured to electrically couple one or more peripheral devices to two or more computers. The method comprises: (a) providing a first hub with an input port and two or more output ports; (b) providing a second hub with an input port and two or more output ports; (c) providing a switch; (d) electrically coupling a first port of the two or more output ports of the first hub to the switch; (e) electrically coupling a first port of the two or more output ports of the second hub to the switch; (f) providing three or more output connectors with each of the three or more output connectors configured to couple to one of the one or more peripheral devices; (g) electrically coupling a second port of the two or more output ports of the first hub to a first output connector of the three or more output connectors; (h) electrically coupling a second port of the two or more output ports of the second hub to a second output connector of the three or more output connectors; and (i) electrically coupling the switch to a third output connector of the three or more output connectors.

Turning to the drawings, FIG. 1 illustrates a switching device 100 coupling computers 181, 182, and 183 to peripheral devices 191, 192, 193, 194, 195, and 196, according to a first embodiment. In some examples, switching device 100 can be considered to be or to include a switchbox or an apparatus for switching. Switching device 100 is merely exemplary and is not limited to the embodiments presented herein. Switching device 100 can be employed in many different embodiments or examples not specifically depicted or described herein.

Switching device 100 can be configured to couple: (a) computer 181 to peripheral devices 191, 193, 194, and 195; (b) computer 182 to peripheral devices 192, 193, 194, and 195; and (c) computer 183 to peripheral devices 193, 194, 195, and 196.

In the embodiment illustrated in FIG. 1, switching device 100 can switch control of peripheral devices 193, 194, and 195 between computers 181, 182, 183. However, each of peripheral devices 191, 192, and 196 are non-switchably controlled by computers 181, 182, and 183, respectively. For example, switching device 100 allows computer 181 to retain control of peripheral device 191 while control of peripheral devices 193, 194, and 195 are switched to computer 182 or 183. This configuration allows computer 181 to continue performing a task (e.g., transfer of data, creating a backup tape, or playing music) using peripheral device 191 while one of computers 182 or 183 controls or uses peripheral devices 193, 194, and 195. Moreover, limiting the number of peripheral devices switched between computers 181, 182, and 183 helps lower the cost of the manufacturing switching device 100.

In some embodiments, switching device 100 can include: (a) at least switch 150; (b) two or more hubs 110, 120, and 130; (c) one or more emulators or emulation devices 107, 108, and 109; (d) a selection device 105; and (e) three or more electrical connectors 161, 162, 163, 141, 142, 143, 144, 145, and 146. In some examples, at least one of hubs 110, 120, and 130 can be a USB hub. In the other examples, switching device 100 does not include emulation devices 107, 108, and 109.

Electrical connectors 141, 142, 143, 144, 145, and 146 can be configured to couple to peripheral devices 191, 192, 193, 194, 195, and 196, respectively. Electrical connectors 161, 162, and 163 can be configured to couple to computers 181, 182, and 183, respectively. In some embodiments, one or more of electrical connectors 161, 162, 163, 141, 142, 143, 144, 145, and 146 can be USB connectors. In the same or different embodiments, one or more of electrical connectors 161, 162, 163, 141, 142, 143, 144, 145, and 146 can be video connectors. That is, at least one of electrical connectors 161, 162, 163, 141, 142, 143, 144, 145, and 146 can be a SCART (Syndicat des Constructeurs d'Appareils Radiorécepteurs et Téléviseurs) connector, an S-video (separate video) connector, a VGA (Video Graphics Array) connector, an HDMI (High-Definition Multimedia Interface) connector, a DVI (Digital Visual Interface), an ADC (Apple Display Connector), or the like.

Switch 150 can be configured to switch peripheral devices 193, 194, and 195 between computers 181, 182, and 183. In some examples, switch 150 can include: (a) two or more input ports 151, 152, and 153; and (b) one or more output ports 154, 155, and 156. Each of output ports 154, 155, and 156 can be configured to couple to one of peripheral devices 193, 194, and 195. Specifically, output ports 154, 155, and 156 can be coupled to peripheral devices 193, 194, and 195, respectively, through electrical connectors 143, 144, and 145, respectively. In some examples, switch 150 is a KVM switch.

In the same or different embodiments, switch 150 can be a cross-point switch. A cross-point switch is a non-blocking switch that allows any input port to connect to any output port without obstructing the connection between any other input and output ports. Accordingly computer 181 could be coupled to peripheral device 195, and computer 182 could be switched between peripheral devices 193 and 194 without disturbing the connection between peripheral device 195 and computer 182.

Hub 110 can include: (a) an upstream port 111 configured to couple to computer 181 through electrical connector 161; (b) a downstream port 112 configured to couple to peripheral device 191 through electrical connector 141; (c) at least one downstream port 113 coupled to switch 150 at input port 151; and (d) a downstream port 114 coupled to emulation device 107.

Hub 120 can include: (a) an upstream port 121 configured to couple to computer 182 through electrical connector 162; (b) a downstream port 122 configured to couple to peripheral device 192 through electrical connector 142; (c) at least one downstream port 123 coupled to switch 150 at input port 152, and (d) a downstream port 124 coupled to emulation device 108.

Hub 130 can include: (a) an upstream port 131 configured to couple to computer 183 through electrical connector 163; (b) a downstream port 132 configured to couple to peripheral device 196 through electrical connector 146; (c) at least one downstream port 133 coupled to switch 150 at input port 153; and (d) a downstream port 134 coupled to emulation device 109.

In some embodiments, computers 181, 182, and 183 could require emulation devices 107, 108, 109, respectively, to be coupled to the computer to function properly. Emulation devices 107, 108, and 109 can make computers 181, 182, and 183, respectively, believe that peripheral devices 193, 194, and 195 (or other similar peripheral devices) are coupled to the computer when peripheral devices 193, 194 and 195 are coupled to another computer by switch 150. For example, many computers need, and several operating systems require, a mouse and keyboard to be coupled to the computer for the computer to function properly. Accordingly, as an example, if peripheral device 193 is a mouse and if peripheral device 194 is a keyboard, emulation devices 107 and 108 can emulate a keyboard and a mouse to computers 181 and 182, respectively, when peripheral devices 193 and 194 are controlled by computer 183.

In some examples, emulation devices 107, 108, and 109 are configured to emulate one or more of peripheral devices 193, 194, and 195. That is, emulation device 107 can emulate one or more of peripheral devices 193, 194, and 195 for computer 181. Emulation device 108 can emulate one or more of peripheral devices 193, 194, and 195 for computer 182. Emulation device 109 can emulate one or more of peripheral devices 193, 194, and 195 for computer 183.

Selection device 105 is configured to allow a user to control switch 150. That is, selection device 105 is configured to control the switching of switch 150. Selection device 105 allows a user to utilize computers 181, 182, and 183 to control peripheral devices 193, 194, and 195. Selection device 105 can be implemented using any type of electrical, mechanical, or electromagnetic mechanism for performing the selection and switching function.

In some embodiments, selection device 105 can be a physical switch. For example, selection device 105 can be a mechanical dial, which can be turned to any one of three discrete positions for selecting one of computers 181, 182, and 183, respectively. Alternatively, selection device 105 can be three mechanical buttons or the like. A user can push one of the buttons to choose one of computers 181, 182, and 183 to control peripheral devices 193, 194, and 195.

In yet another embodiment, selection device 105 can be a software and/or hardware components that allows the user to perform the selection process through peripheral devices 193, 194, and 195 and/or computers 181, 182 and/or 183. That is, a window, a button, or the like can appear on the computer screen of a video monitor, and the user can switch control of peripheral devices 193, 194, and 195 between computers 181, 182, and 183.

In the embodiment illustrated in FIG. 1, switching device 100 switches three computers between three peripheral devices. None of the embodiments described herein, however, are limited to switching three peripheral devices between three computers. For example in other embodiments switching device 100 could switch one, two, four, or more peripheral devices between two, four, or more computers.

Similarly, switching device 100 couples each of computers 181, 182, and 183 to one non-switched peripheral device (i.e., peripheral devices 191, 192 and 196, respectively). In other embodiments, switching device 100 could couple each of computers 181, 182, and 183 to zero, two, or more non-switched peripheral devices.

Figure 2:
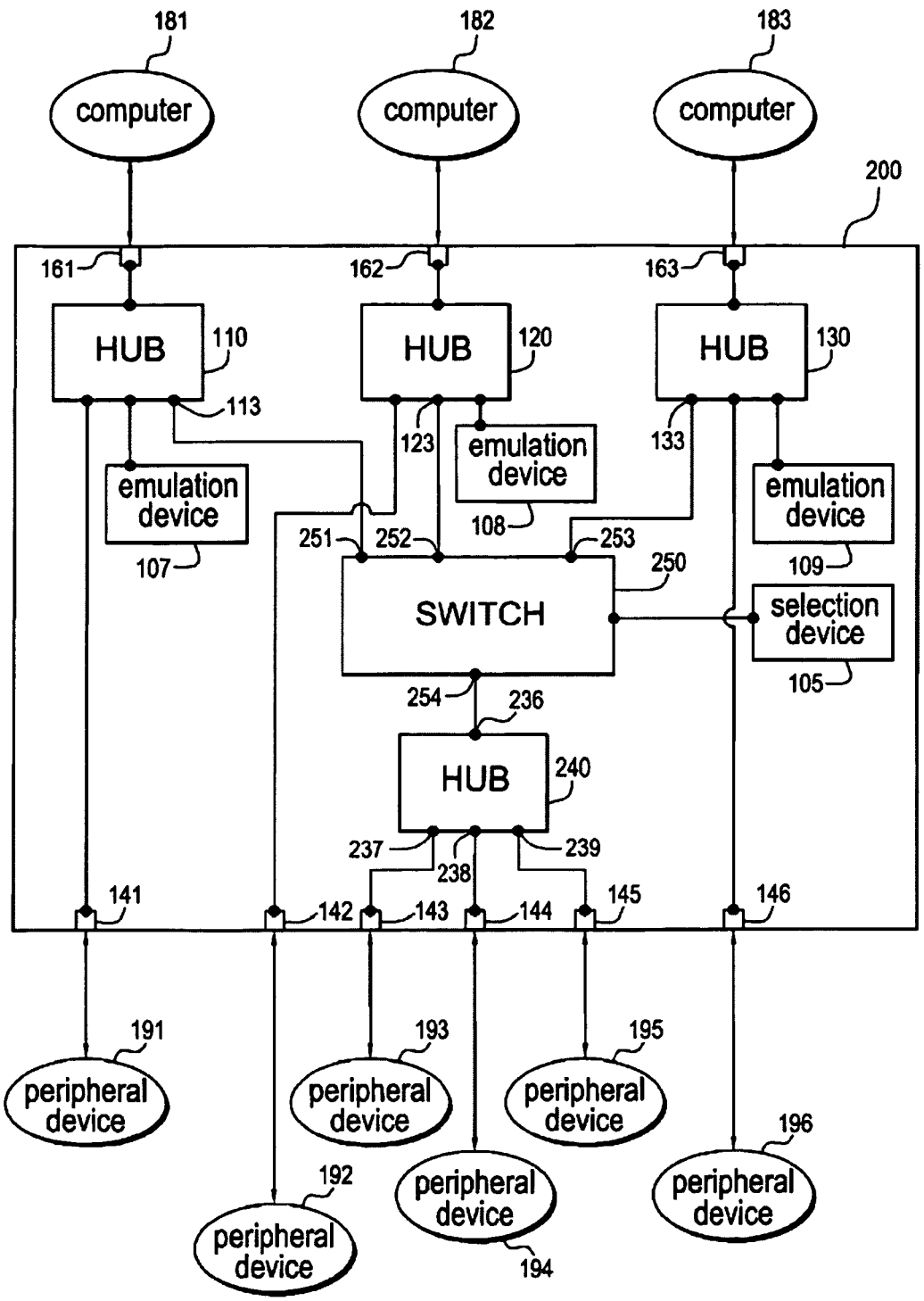
FIG. 2 illustrates a switching device coupling three computers to six peripheral devices, according to a second embodiment.

FIG. 2 illustrates a switching device 200 coupling computers 181, 182, and 183 to peripheral devices 191, 192, 193, 194, 195, and 196, according to a second embodiment. Referring to FIG. 2, switching device 200 can be configured to couple: (a) computer 181 to peripheral devices 191, 193, 194, and 195; (b) computer 182 to peripheral devices 192, 193, 194, and 195; and (c) computer 183 to peripheral devices 193, 194, 195, and 196. From the perspective of computer 181, 182, and 183 and peripheral devices 191, 192, 193, 194, 195, and 196, switching device 200 functions identically to switching device 100 (FIG. 1).

In some embodiments, a switching device 200 can include: (a) at least one switch 250; (b) three or more hubs 110, 120, 130, and 240; (c) one or more emulation devices 107, 108, and 109; (d) a selection device 105; and (e) five or more electrical connectors 141, 142, 143, 144, 145, 146, 161, 162, and 163. In other examples, switching device 200 does not include emulation devices 107, 108, and 109.

In some examples, hub 240 can include an upstream port 236 and two or more downstream ports 237, 238, and 239. Downstream ports 237, 238, and 239 are coupled to peripheral devices 193, 194, and 195 through electrical connectors 143, 144, and 145, respectively. In some examples, hub 240 is a USB hub.

In various embodiments, switch 250 can be a three input and one output switch. That is, switch 250 switches the one output port 254 between the three input ports 251, 252, and 253. In various examples, downstream ports 113, 123, and 133 are coupled to input ports 251, 252, and 253, respectively. Output port 254 is coupled to an upstream port 236 of hub 240.

Figure 3:
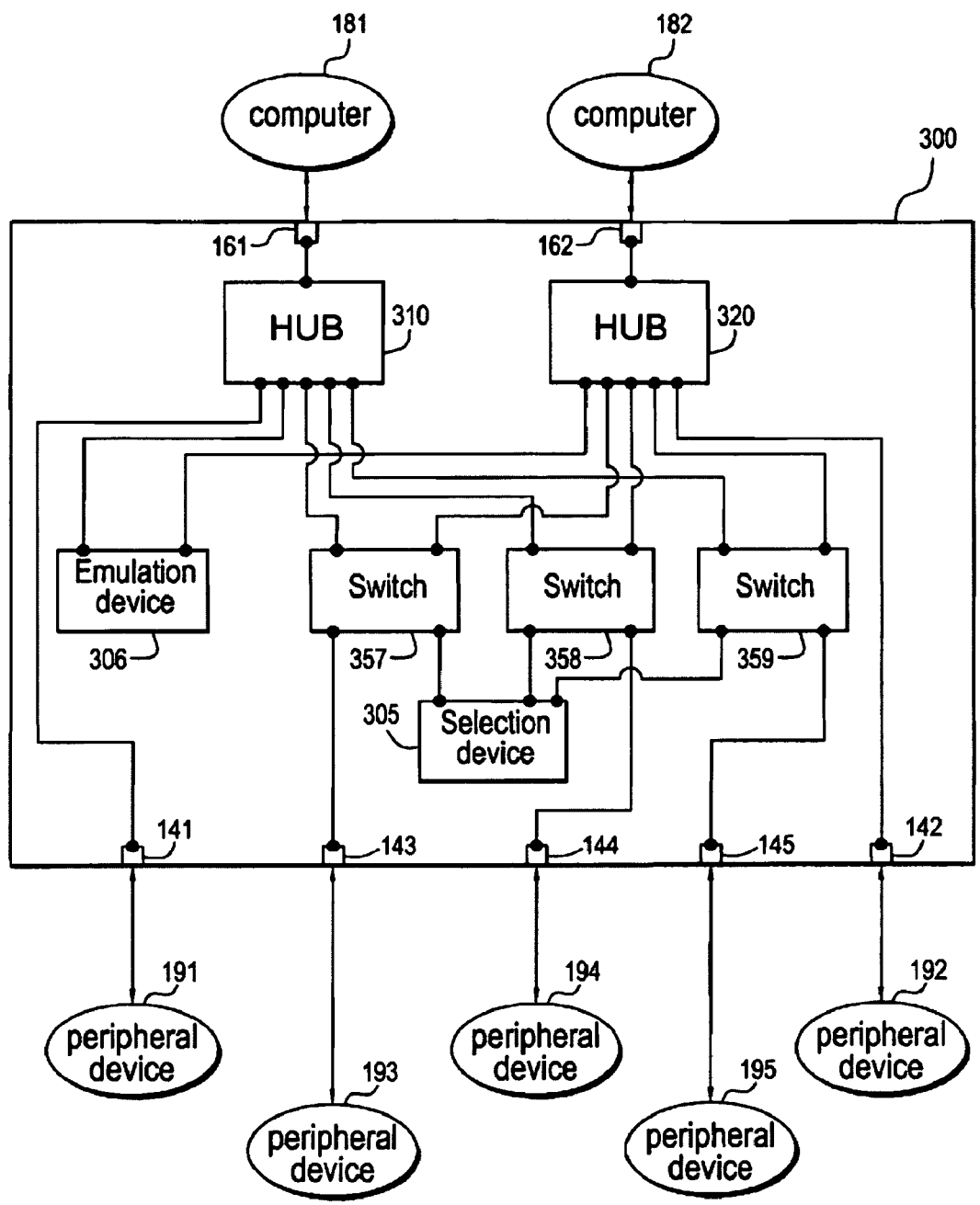
FIG. 3 illustrates a switching device coupling two computers to five peripheral devices, according to a third embodiment.

Referring to another embodiment, FIG. 3 illustrates a switching device 300 coupling computers 181 and 182 to peripheral devices 191, 192, 193, 194, and 195, according to a third embodiment. In this embodiment, switching device 300 is configured to switch peripheral devices 193, 194, and 194 between computers 181 and 182 and non-switchably couple each of computers 181 and 182 to peripheral devices 191 and 192, respectively. That is, switching device 300 is configured to couple: (a) computer 181 to peripheral devices 191, 193, 194, and 195; and (b) computer 182 to peripheral devices 192, 193, 194, and 195. In some embodiments, peripheral devices 193, 194, and 195 can be a keyboard, a mouse, and a video monitor, respectively.

In some embodiments, switching device 300 can include: (a) one or more switches 357, 358, and 359; (b) two or more hubs 310 and 320; (c) at least one emulation device 306; (d) a selection device 305; and (e) three or more electrical connectors 141, 142, 143, 144, 145, 161, and 162.

In some examples, switch 357 can be coupled to a downstream port of each of hubs 310 and 320 and configured to couple to peripheral device 193 through electrical connector 143. In some examples, switch 357 can be a multiplexer. In various embodiments, switch 357 can be a keyboard switch or keyboard multiplexer.

In the same or different examples, switch 358 can be coupled to the downstream ports of each of hubs 310 and 320 and configured to couple to peripheral device 194, through electrical connector 144. Switch 358 can be a multiplexer. In various embodiments, switch 358 can be a mouse switch or a mouse multiplexer.

Similarly, switch 359 can be coupled to the downstream ports of each of hubs 310 and 320 and configured to couple to peripheral device 195 through electrical connector 145. Switch 359 can be a multiplexer in some examples. In various embodiments, switch 359 can be a video switch or video multiplexer. When switch 359 is a video switch or video multiplexer, electrical connector 145 can be a video connector.

Selection device 305 can be coupled to switches 357, 358, and 359. In some embodiments, selection device 305 can allow the user to independently select which of computers 181 and 182 control each of peripheral devices 193, 194, and 195. For example, selection device 305 can include a selection dial for each of peripheral devices 193, 194, and 195. In other embodiments, selection device can be identical or similar to selection device 105 of FIG. 1.

In some examples, emulation device 306 is configured to emulate one or more of peripheral devices 193, 194, and 195. For example, if peripheral device 193 is a computer mouse, peripheral device 194 is a keyboard, and peripheral device 195 is a video monitor, emulation device 306 can emulate a mouse, a keyboard, and/or a video monitor to computers 181 and 182.

In some embodiments, emulation device 306 only emulates peripheral devices 193, 194, and 195 to the one of computers 181 and 182 not currently controlling peripheral devices 193, 194, and 195. In other embodiments, emulation device 306 emulates the coupling of peripheral devices 193, 194, and 195 or other peripheral devices to computers 181 and 182 regardless of which of computers 181 and 182 are controlling peripheral devices 193, 194, and 195. For example, if peripheral device 193 is a mouse and if computer 181 is controlling peripheral device 193, emulation device 306 could make it appear to computer 181 that two mice are coupled to computer 181.

In alternative examples, emulation device 306 can include or be replaced by one or more emulation modules. Each of the emulation modules can be configured to emulate at least one of peripheral devices 193, 194, and 195. In some examples, each of the one or more emulation modules can be coupled to one hub of hubs 310 and 320.

Figure 4:
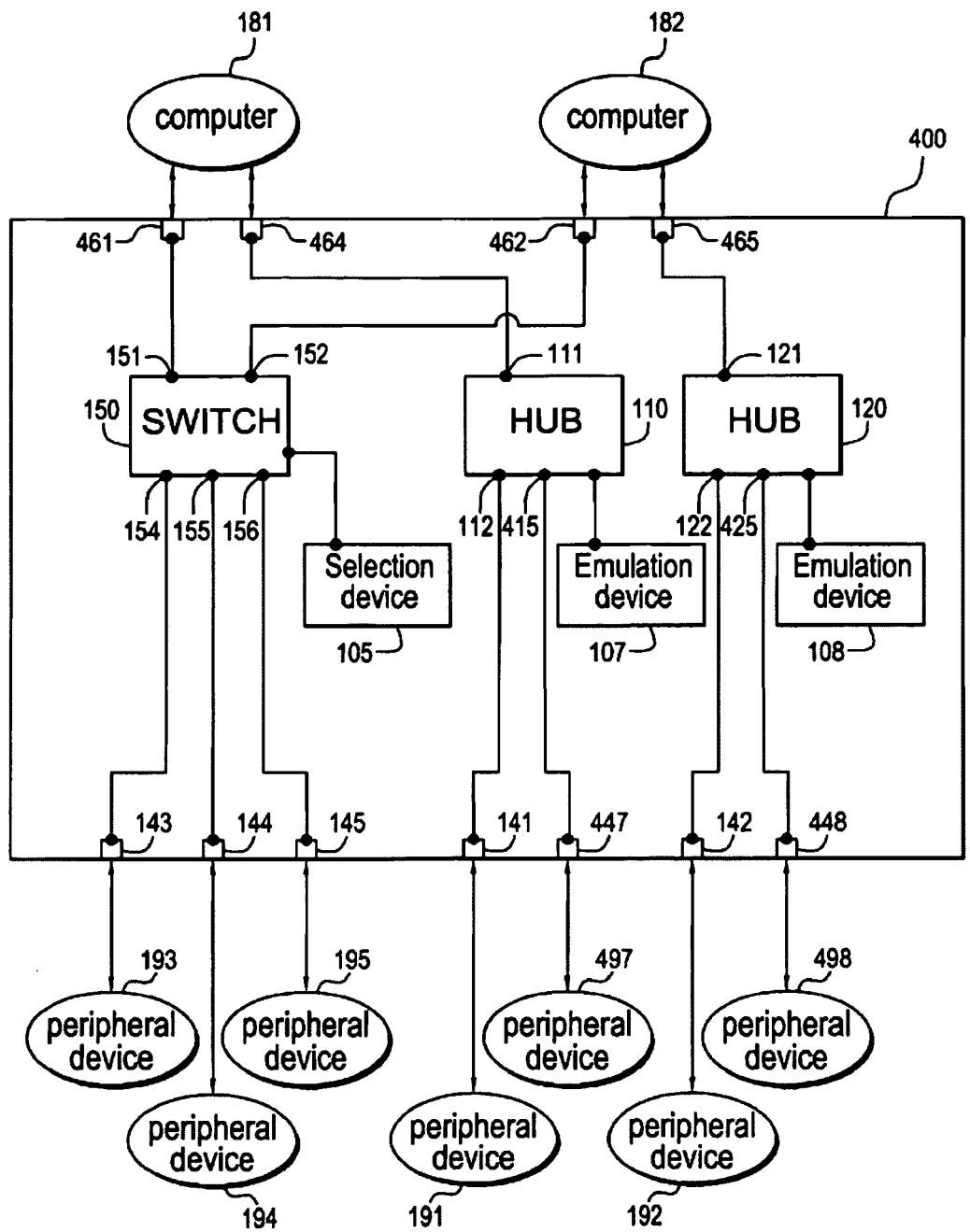
FIG. 4 illustrates a switching device coupling two computers to seven peripheral devices, according to a fourth embodiment.

FIG. 4 illustrates a switching device 400 coupling computers 181 and 182 to peripheral devices 191, 192, 193, 194, 195, 497, and 498, according to a fourth embodiment. In this embodiment, switching device 400 is configured to switch peripheral devices 193, 194, and 195 between computers 181 and 182 and non-switchably couple computer 181 to peripheral devices 191 and 497, and non-switchably couple computer 182 to peripheral devices 192 and 498.

In some embodiments, switching device 400 can include: (a) at least one switch 150; (b) two or more hubs 110 and 120; (c) emulation devices 107 and 108; (d) selection device 105; and (e) electrical connectors 141, 142, 143, 144, 145, 447, 448, 461, 462, 464, and 465. In some examples, electrical connectors 461 and 464 can be configured to couple to computer 181; electrical connectors 462 and 465 can be configured to couple to computer 182; electrical connectors 141, 142, 143, 144, 145, 447, and 448 can be configured to couple to peripheral devices 191, 192, 193, 194, 195, 497, and 498, respectively. In other embodiments, switching device 400 does not include emulation devices 107 and 108.

In these embodiments, computers 181 can be coupled to switch 150 and hub 110. Specifically, electrical connector 461 is coupled to input port 151 of switch 150; electrical connector 464 is coupled to upstream port 111 of hub 110.

Likewise, computer 182 can be coupled to switch 150 and hub 120. That is, electrical connector 462 is coupled to input port 152 of switch 150; electrical connector 465 is coupled to upstream port 121 of hub 120.

Hub 110 can be configured to couple to peripheral devices 191 and 497. Specifically, downstream ports 112 and 415 can be coupled to electrical connectors 141 and 447, respectively. Similarly, hub 120 can be configured to couple to peripheral devices 192 and 498. That is, downstream ports 122 and 425 can be coupled to electrical connectors 142 and 448, respectively.

Figure 5:
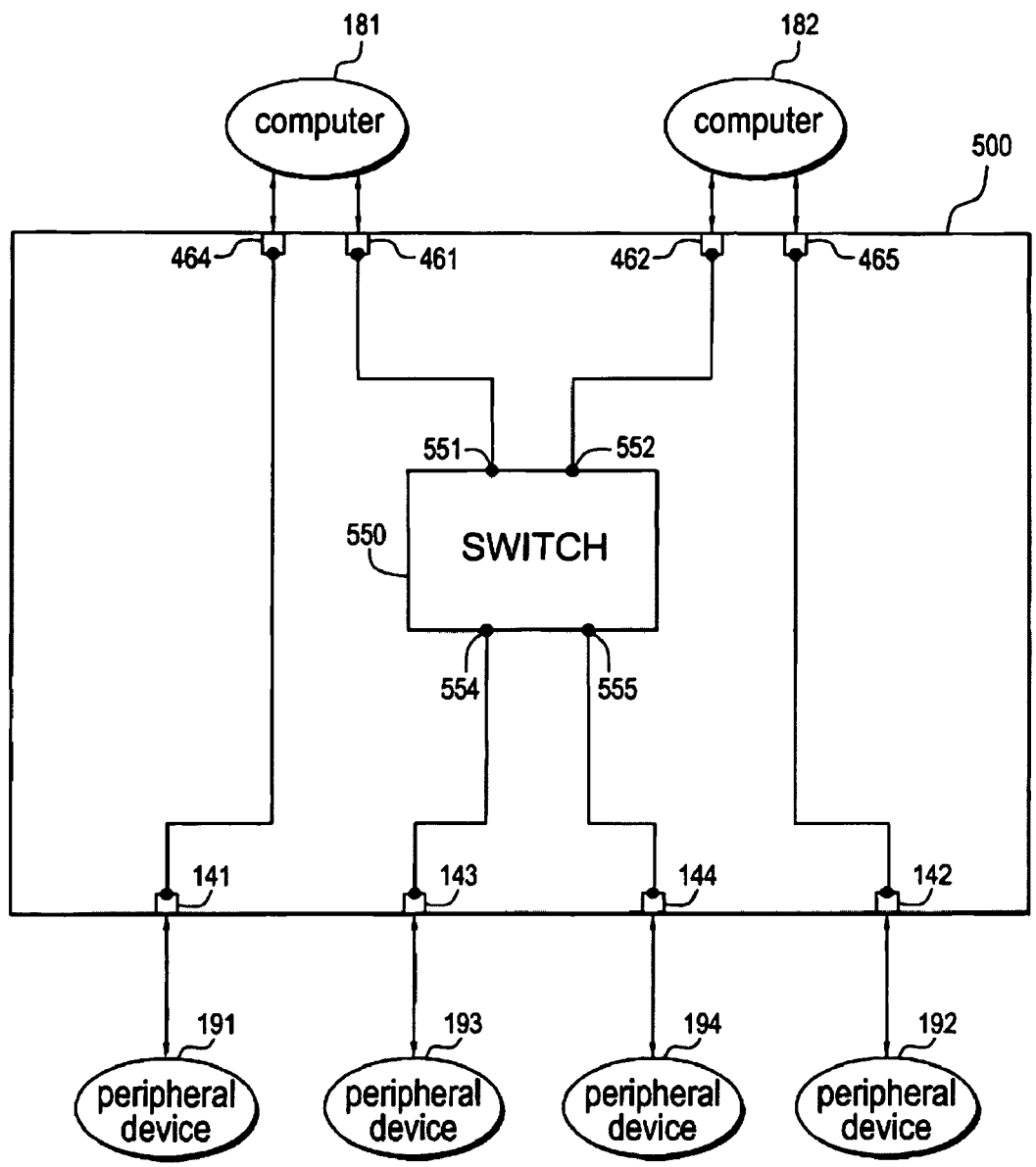
FIG. 5 illustrates a switching device coupling two computers to four peripheral devices, according to a fifth embodiment.

FIG. 5 illustrates a switching device 500 coupling computers 181 and 182 to peripheral devices 191, 192, 193, and 194, according to a fifth embodiment. Referring to FIG. 5, switching device 500 can include: (a) a switch 550; and (b) electrical connectors 141, 142, 143, 144, 461, 462, 464, and 465. In this embodiment, switching device 500 is configured to switch peripheral devices 193 and 194 between computers 181 and 182 and non-switchably couple computer 181 to peripheral devices 191, and non-switchably couple computer 182 to peripheral devices 192.

In some embodiments, electrical connector 464 and 465 can be coupled to electrical connectors 141 and 142, respectively. Electrical connectors 461 and 462 can be coupled to input ports 551 and 552 of switch 550, respectively. Electrical connectors 143 and 144 can be coupled to output ports 554 and 555 of switch 550, respectively.

Figure 6:
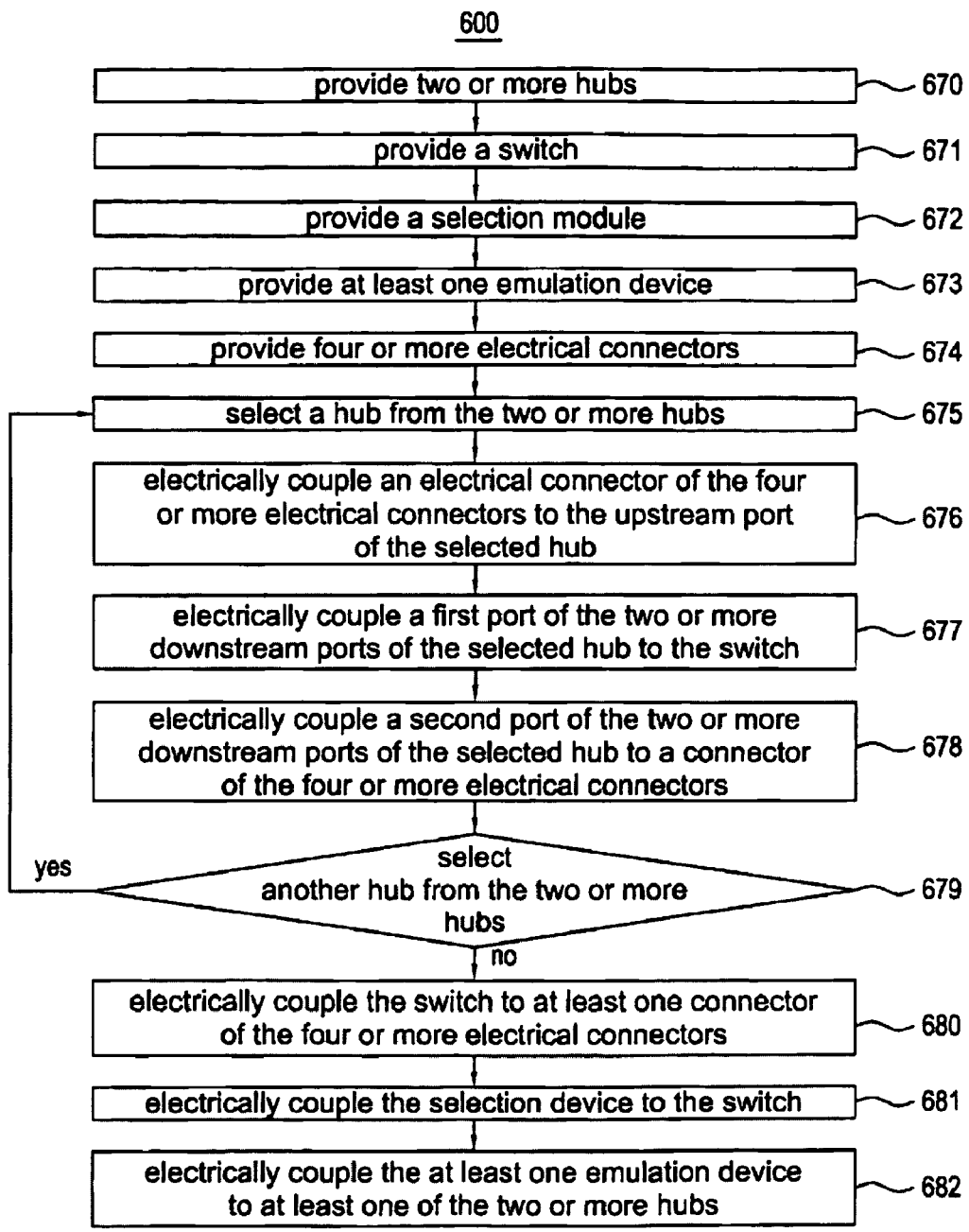
FIG. 6 illustrates a flow chart for an embodiment of a method of manufacturing a switching apparatus.

FIG. 6 illustrates an embodiment of a method 600 of manufacturing a switching apparatus. For example, the switching apparatus can be identical or similar to switching device 100 of FIG. 1. In some embodiments, the switching apparatus can be configured to electrically couple three or more peripheral devices to two or more computers.

Method 600 includes an activity 670 of providing two or more hubs. Each hub of the two or more hubs can have an upstream port and two or more downstream ports. As an example, the two or more hubs can be similar or identical to hubs 110, 120, and/or 130 of FIG. 1. The upstream port of each hub can be similar or identical to upstream ports 111, 121, and/or 131 of hubs 110, 120 and 130, respectively, as illustrated in FIG. 1. The two or downstream ports of each hub can be identical or similar to downstream ports 112, 113, and 114 of hub 110, downstream ports 122, 123, and 124 of hub 120, and/or downstream ports 132, 133, and 134 of hub 130, as illustrated in FIG. 1.

Method 600 in FIG. 6 continues with an activity 671 of providing a switch. For example, the switch can be similar or identical to switch 150 or 250, as illustrated in FIGS. 1 and 2, respectively.

In other examples, the switch can be composed of or replaced with one or more switching modules. Each of the switching modules can switch one of the peripheral devices between the two or more computers. For example, each of the switching modules can be identical or similar to the switches 357, 358, and 359 of FIG. 3.

Subsequently, method 600 of FIG. 6 includes an activity 672 of providing a selection module. For example, the selection module can be identical or similar to selection device 105 or 305 of FIGS. 1 and 3, respectively.

Next, method 600 of FIG. 6 includes an activity 673 of providing at least one emulation device. For example, the at least one emulation device can be similar or identical to emulation devices 107, 108, and/or 109 as illustrated in FIG. 1 or emulation device 306 as illustrated FIG. 3.

Method 600 in FIG. 6 continues with an activity 674 of providing four or more electrical connectors. For example, the four or more connectors can be similar or identical to electrical connectors 141, 142, 143, 144, 145, 146, 161, 162, and/or 163, as illustrated in FIG. 1.

In some examples, activity 674 can be considered to include the procedures of: (a) providing two or more output connectors; and (b) providing two or more input connectors. That is, the four or more electrical connectors can include the input connectors. Each of the input connectors can be configured to couple to one of the two or more computers. In some examples, the input connectors can be similar or identical to electrical connectors 161, 162, and 163, as illustrated in FIG. 1.

The four or more electrical connectors can also include two or more output connectors. Each of the output connectors can be configured to couple to one of the one or more peripheral devices. In some examples, the output connectors can be similar or identical to electrical connectors 141, 142, 143, 144, 145, and 146, as illustrated in FIG. 1.

Subsequently, method 600 of FIG. 6 includes an activity 675 of selecting a hub from the two or more hubs. In the example illustration FIG. 1, one of hubs 110, 120, or 130 (FIG. 1) can be selected.

Referring again to FIG. 6, after selecting a hub from the two or more hubs, method 600 of FIG. 6 includes an activity 676 of electrically coupling an electrical connector of the four or more electrical connectors to the upstream port of the selected hub. For example, electrically coupling an electrical connector of the four or more electrical connectors to the upstream port of the selected hub can be similar or identical to the coupling of upstream port 111 to electrical connector 161, the coupling of upstream port 121 to electrical connector 162, and/or the coupling of upstream port 131 to electrical connector 163, as illustrated in FIG. 1.

Method 600 in FIG. 6 continues with an activity 677 of electrically coupling a first port of the two or more downstream ports of the selected hub to the switch. For example, the electrical coupling of the first port of the two or more downstream ports of the selected hub to the switch can be similar or identical to the coupling of downstream port 113 to input port 151 of switch 150, the coupling of downstream port 123 of hub 120 to input port 152 of switch 150, and/or the coupling of downstream port 132 to input port 153 of switch 150, as illustrated in FIG. 1.

Subsequently, method 600 of FIG. 6 includes an activity 678 of electrically coupling a second port of the two or more downstream ports of the selected hub to an electrical connector of the four or more electrical connectors. For example, the electrical coupling of the second port of the two or more downstream ports of the selected hub to the electrical connector of the four or more electrical connectors can be similar or identical to the coupling of downstream port 112 to electrical connector 141, the coupling of downstream port 122 to electrical connector 142, and/or the coupling of downstream port 132 to electrical connector 146, as illustrated in FIG. 1.

Next, method 600 of FIG. 6 includes an activity 679 of deciding whether to select another hub. If any of the two or more hubs have not already been selected, the next activity in method 600 is activity 675 of selecting a hub from the two or more hubs. If every hub of the two or more hubs has been already been selected, the next activity in method 600 is an activity 680. In the example illustrated in FIG. 1, if all of hubs 110, 120, and 130 have not been selected, the next procedure is activity 675 (FIG. 6). If all of hubs 110, 120, and 130 have been selected, the next procedure is activity 680 (FIG. 6).

Referring again to FIG. 6, activity 680 of method 600 in FIG. 6 is an activity of electrically coupling the switch to at least one electrical connector of the four or more electrical connectors. For example, the electrical coupling of the switch to at least one electrical connector of the four or more electrical connectors can be similar or identical to the coupling of output ports 154, 155, and 156 of switch 150 to electrical connectors 143, 144, and 145, respectively, as illustrated in FIG. 1.

In some embodiments, the switch can be coupled to the four or more electrical connectors through a hub. For example, the electrical coupling of the switch to at least one electrical connector of the four or more electrical connectors can be similar or identical to the coupling of switch 250 to electrical connectors 143, 144, and 145 through hub 240, as illustrated in FIG. 2.

Subsequently, method 600 of FIG. 6 includes an activity 681 of electrically coupling the selection device to the switch. The electrical coupling of selection device to the switch can be similar or identical to the coupling of selection device 105 to switch 150, as illustrated in FIG. 1 or the coupling of selection devices 305 to switches 357, 358, and 359, as illustrated in FIG. 3.

Next, method 600 of FIG. 6 includes an activity 682 of electrically coupling the at least one emulation device to the at least one of the two or more hubs. For example, coupling of the at least one emulation device to the at least one of the two or more hubs can be similar or identical to the coupling of emulation devices 107, 108, and 109 to hubs 110, 120, and 130, respectively, as illustrated in FIG. 1. In another example, the coupling can be similar or identical to the coupling of emulation device 306 to hubs 310 and 320, as illustrated in FIG. 3.

In other embodiments, the order of activities 670-682 can vary. For example, activities 680-682 could occur before or concurrent with activities 675-679. In another example, activity 674 can occur before or concurrent with activities 670, 671, and 673. In still another example, activities 675-679 could occur before, after, or concurrent with activities 670-674 and 680-682.

Although the invention has been described with reference to specific embodiments, it will be understood by those skilled in the art that various changes may be made without departing from the spirit or scope of the invention. For example, it will be readily apparent the switching device could be configured such that a user can decide whether emulation devices 107, 108, and 109 (FIG. 1) emulate one or more of peripheral devices 193, 194, and 195 (FIG. 1). Additional examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. To one of ordinary skill in the art, it will be readily apparent that the case and method of use discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A switching device configured to couple a first computer to a first peripheral device and one or more second peripheral devices, the switching device is further configured to couple a second computer to a third peripheral device and the one or more second peripheral devices, the switching device comprising:
   a switch configured to couple to the one or more second peripheral devices;
   a first hub comprising:
      a first upstream port configured to couple to the first computer;
      a first downstream port configured to couple to the first peripheral device; and
      at least one second downstream port coupled to the switch;
   a second hub comprising:
      a first upstream port configured to couple to the second computer;
      a first downstream port configured to couple to the third peripheral device; and
      at least one second downstream port coupled to the switch;
   a first electrical connector coupled to the first downstream port of the first hub and configured to couple to the first peripheral device;
   a second electrical connector coupled to the first downstream port of the second hub and configured to couple to the third peripheral device; and
   one or more third connectors coupled to the switch and configured to couple to the one or more second peripheral devices.

2. The switching device of claim 1, wherein:
   the switch comprises:
      one or more output ports; and
   each of the one or more output ports is configured to couple to one of the one or more second peripheral devices.

3. The switching device of claim 1, wherein:
   the one or more third electrical connectors comprise at least one universal serial bus connector and a video connector.

4. The switching device of claim 1, further comprising:
   a third hub comprising:
      a first upstream port configured to couple to the switch; and
      one or more downstream ports configured to couple to the one or more second peripheral devices.

5. The switching device of claim 1, wherein:
   the switch comprises a keyboard, video, mouse switch.

6. The switching device of claim 1, wherein:
   the first hub comprises a universal serial bus hub; and
   the second hub comprises a universal serial bus hub.

7. The switching device of claim 1, wherein:
   the switch comprises:
      a cross-point switch coupled to the at least one second downstream port of the first hub and the at least one second downstream port of the second hub.

8. The switching device of claim 1, further comprising:
   a first emulation device configured to emulate at least one of the one or more second peripheral devices,
   wherein:
   the first hub further comprises:
      a third downstream port coupled to the first emulation device.

9. The switching device of claim 1, further comprising:
   a selection device configured to allow a user to select which of the first computer and the second computer controls the one or more second peripheral devices.

10. The switching device of claim 1, wherein:
    the first electrical connector is directly coupled to the first downstream port of the first hub; and
    the second electrical connector is directly coupled to the first downstream port of the second hub.

11. The switching device of claim 2, further comprising:
    a fourth electrical connector coupled to the first upstream port of the first hub and configured to couple to the first computer; and
    a fifth electrical connector coupled to the first upstream port of the second hub and configured to couple to the second computer.

12. The switching device of claim 11, wherein:
    the fourth electrical connector and the fifth electrical connector are universal serial bus connectors.

13. The switching device of claim 8, further comprising:
    a second emulation device configured to emulate at least one of the one or more second peripheral devices,
    wherein:
    the second hub further comprises:
       a third downstream port coupled to the second emulation device.

14. The switching device of claim 9, wherein:
the selection device comprises a physical switch.

15. An electronic switchbox configured to switch a keyboard and a mouse between two or more computers and couple the two or more computers to two or more peripheral devices, the electrical switchbox comprising:
a keyboard switch configured to couple to the keyboard;
a mouse switch configured to couple to the mouse; and
two or more hubs,
wherein:
each hub of the two or more hubs is configured to couple a computer of the two or more computers to the keyboard switch and the mouse switch; and
each of the two or more hubs is further configured to couple the computer of the two or more computers to at least one peripheral device of the two or more peripheral devices without using the keyboard switch or the mouse switch.

16. The switch box of claim 15, further comprising:
a video switch configured to couple to a video monitor;
wherein:
each hub of the one or more hubs is further configured to couple the computer of the two or more computers to the video switch; and
each of the two or more hubs is further configured to couple the computer of the two or more computers to the at least one peripheral device of the two or more peripheral devices without using the video switch.

17. The switchbox of claim 15, wherein:
each hub of the one or hubs comprises:
an upstream port configured to couple to one of the two or more computers; and
one or more downstream ports;
the keyboard switch comprises:
a first multiplexer coupled to a first one of the one or more downstream ports of each hub of the two or more hubs, the first multiplexer is further configured to couple to the keyboard; and
the mouse switch comprises:
a second multiplexer coupled to a second one of the one or more downstream ports of each hub of the two or more hubs, the second multiplexer is further configured to couple to the mouse.

18. The switchbox of claim 15, further comprising:
an emulator configured to emulate the keyboard and the mouse to at least one of the two or more computers.

19. The switch box of claim 15, wherein:
each of the two or more hubs is further configured to directly couple to the computer of the two or more computers; and
each of the two or more hubs is further configured to directly couple to the at least one peripheral device of the two or more peripheral devices.

20. The switch box of claim 16, wherein:
the keyboard switch, the video switch, and the mouse switch are integrated into a single switch.

21. The switchbox of claim 18, wherein:
the emulator comprises:
one or more emulation modules;
each of the one or more emulation modules configured to emulate the keyboard and the mouse to one of the two or more computers; and
each of the one or more emulation modules is coupled to one hub of the two or more hubs.

22. An apparatus configured to switch one or more first peripheral devices between at least two computers, the apparatus is also configured to couple a first computer of the at least two computers to one or more second peripheral devices and to couple a second computer of the at least two computers to one or more third peripheral devices, the apparatus comprising:
a switch configured to couple to the at least two computers and the one or more first peripheral devices;
a first connector configured to couple to the first computer of the at least two computers;
a second connector directly coupled to the first connector and configured to couple to the one or more second peripheral devices;
a third connector configured to couple to the second computer of the at least two computers; and
a fourth connector directly coupled to the third connector and configured to couple to the one or more third peripheral devices.

23. The apparatus of claim 22, further comprising:
a fifth connector coupled to the switch and configured to couple to the first computer of the at least two computers;
a sixth connector coupled to the switch and configured to couple to the second computer of the at least two computers; and
a seventh connector coupled to the switch and configured to couple to one of the one or more first peripheral devices.

24. A method of manufacturing a switching apparatus, the switching apparatus configured to electrically couple one or more peripheral devices to two or more computers, the method comprising:
providing a first hub with an upstream port and two or more downstream ports;
providing a second hub with an upstream port and two or more downstream ports;
providing a switch;
electrically coupling a first port of the two or more downstream ports of the first hub to the switch;
electrically coupling a first port of the two or more downstream ports of the second hub to the switch;
providing three or more output connectors configured to couple to the one or more peripheral devices;
electrically coupling a second port of the two or more downstream ports of the first hub to a first output connector of the three or more output connectors;
electrically coupling a second port of the two or more downstream ports of the second hub to a second output connector of the three or more output connectors; and
electrically coupling the switch to a third output connector of the three or more output connectors.

25. The method of claim 24, further comprising:
providing two or more input connectors configured to couple to one of the two or more computers;
electrically coupling a first input connector of the two or more input connectors to the upstream port of the first hub; and
electrically coupling a second input connector of the two or more input connectors to the upstream port of the second hub.

26. The method of claim 24, wherein:
providing the three or more output connectors comprises:
providing the three or more output connectors to comprise three or more universal serial bus connectors.

27. The method of claim 24, further comprising:
providing a third hub with an upstream port and two or more downstream ports;
electrically coupling a first port of the two or more downstream ports of the third hub to the switch; and electrically coupling a second port of the two or more downstream ports of the third hub to a fourth output connector of the three or more output connectors.

28. The method of claim 24, further comprising:
electrically coupling a third port of the two or more downstream ports of the first hub to a fourth output connector of the three or more output connectors.

29. The method of claim 24, wherein:
electrically coupling the second port of the two or more downstream ports of the first hub comprises:
directly coupling the second port of the two or more downstream ports of the first hub to the first output connector of the three or more output connectors; and
electrically coupling the second port of the two or more downstream ports of the second hub comprises:
directly coupling the second port of the two or more downstream ports of the second hub to the second output connector of the three or more output connectors.

* * * * *